Feb. 22, 1927.
J. E. QUIGLEY
1,618,675
COOKING UTENSIL
Filed April 10, 1926
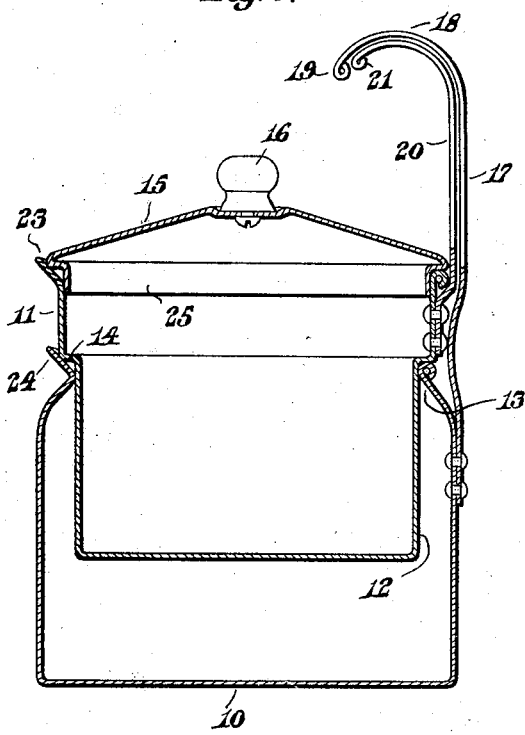
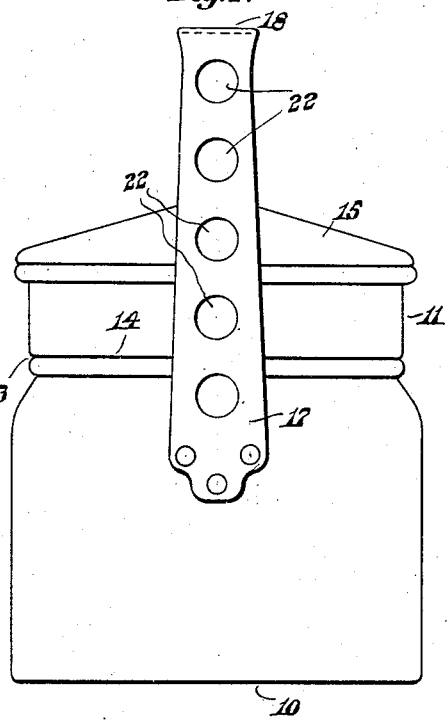
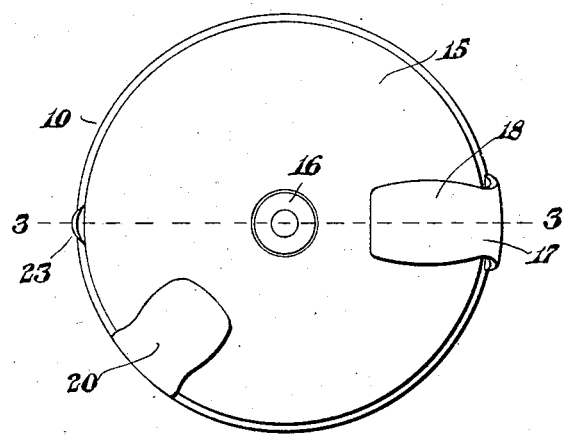
Inventor:
Julia E. Quigley,
by Walter E. Lombard,
Atty.

Patented Feb. 22, 1927.

1,618,675

UNITED STATES PATENT OFFICE.

JULIA E. QUIGLEY, OF CHARLESTOWN, MASSACHUSETTS.

COOKING UTENSIL.

Application filed April 10, 1926. Serial No. 101,110.

This invention relates to cooking utensils adapted to be placed immediately above the fire in a cooking range, the object of the invention being to provide these articles with perforated handles which will not extend beyond the boundaries of the utensils so that said handles will not be subjected to the direct heat from the fire.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claim.

Of the drawings:

Figure 1 is a plan of double boiler, embodying the principles of the present invention.

Figure 2 is a side elevation of same, and

Figure 3 is a section of same on line 3, 3 on Fig. 1.

Similar characters indicate like parts throughout the several figures of the drawing.

In the drawings, 10 is a cylindrical receptacle forming one part of a double boiler, the other part of said boiler consisting of another receptacle 11, the lower end 12 of which is of reduced diameter and is inserted into the open upper end 13 of the lower receptacle 10.

The reduced lower end 12 of the upper receptacle 11 forms a shoulder 14 which rests upon the upper end of the part 10.

The upper receptacle 11 has a cover 15 of usual construction, this cover having a knob 16 by which said cover may be removed.

The receptacle 10 has riveted to its outer wall a handle 17 which extends upwardly above the top of the upper receptacle and is then curved inwardly, as at 18, with an enlargement 19 at its extreme end.

The upper receptacle has riveted thereto a similar handle 20 which is formed to fit within the handle 17 as shown in Fig. 3.

This handle 20 is also provided with an enlargement 21 at its extreme end thereby preventing the hand grasping the handles 17, 20 from slipping off the upper ends thereof.

Normally the handles 17, 20 are in the same vertical plane and closely adjacent each other, so that both may be grasped at once in order to lift simultaneously both receptacles.

When it is desired to remove the upper receptacle 11 from the lower receptacle 10, the former is moved about its vertical axis in order to permit the handle 20 to be grasped without disturbing the lower receptacle 10.

By making the handles to the cooking receptacles in the manner shown in the drawings, they are not subjected to the direct heat of the fire within the cooking range on which the receptacles rest.

As the handles project over the utensils the heat from the fire, in order to reach said handles, must pass through the receptacles and the contents thereof and as a consequence, these handles remain much cooler than the present style of handles which radiate from the walls of the utensils.

In order to assist in the cooling of these handles the part thereof to be grasped is provided with a plurality of perforations 22 through which cool air may freely pass.

One great advantage of the present invention is the dispensing with the long radial handles usually found on articles of this character.

These long handles are often the cause of serious accidents by being carelessly hit, causing the utensil to be upset and the heated contents spilled, sometimes on children and badly scalding them.

With handles such as are herein shown and described such accidents are impossible.

Moreover, the long radial handles occupy considerable space and prevent the utensils being disposed economically on the top of the stove.

This objection is overcome by using the handles shown and described herein as a variety of utensils may be disposed over the entire top of the stove in close proximity to each other where the new type of handles are used on the different utensils.

This is of great advantage not only in homes but also in hotels and restaurants where a great variety of different foods must be cooked at the same time.

The old type handles are subjected to intense heat rising from the fire and often get so hot that serious burns result to the persons handling the utensils.

Another great advantage of my cooking utensils is that the utensils may be lifted easily with the new style of handle as these handles are grasped at a point nearer the center of gravity.

The lower receptacle 10 has a pouring spout 24 in its upper edge opposite the handle 17 and the upper edge of receptacle 11 is provided with a similar spout 23 opposite the handle 20.

When it is desired to empty either receptacle the handle thereof is grasped and the receptacle tilted so that the contents may be poured out just as from a pitcher.

This is a great convenience over the old style cooking utensils where the pouring spout is generally at right angles to the long projecting handle.

The reduced bottom 12 of the upper receptacle 11 closes the spout 24 when the two parts 10, 11 are nested together, and the downwardly extending flange 25 of cover 15 closes the pouring spout 23 of receptacle 11.

It is believed that the operation and many advantages of the invention will be understood without further description.

Having thus described my invention, I claim:

A cooking utensil consisting of two parts nested together and each having a handle extending perpendicularly from the vertical wall thereof with its upper end projecting inwardly over the utensil, the handle of one part fitting closely within the handle of the other part whereby both parts may be lifted together.

Signed by me at 746 Old South Bldg., Boston, Mass., this 9th day of April, 1926.

JULIA E. QUIGLEY.